June 10, 1958  SHINZO SUMIYA  2,838,108
MULTIPLE EFFECT VACUUM EVAPORATOR
Filed May 9, 1955
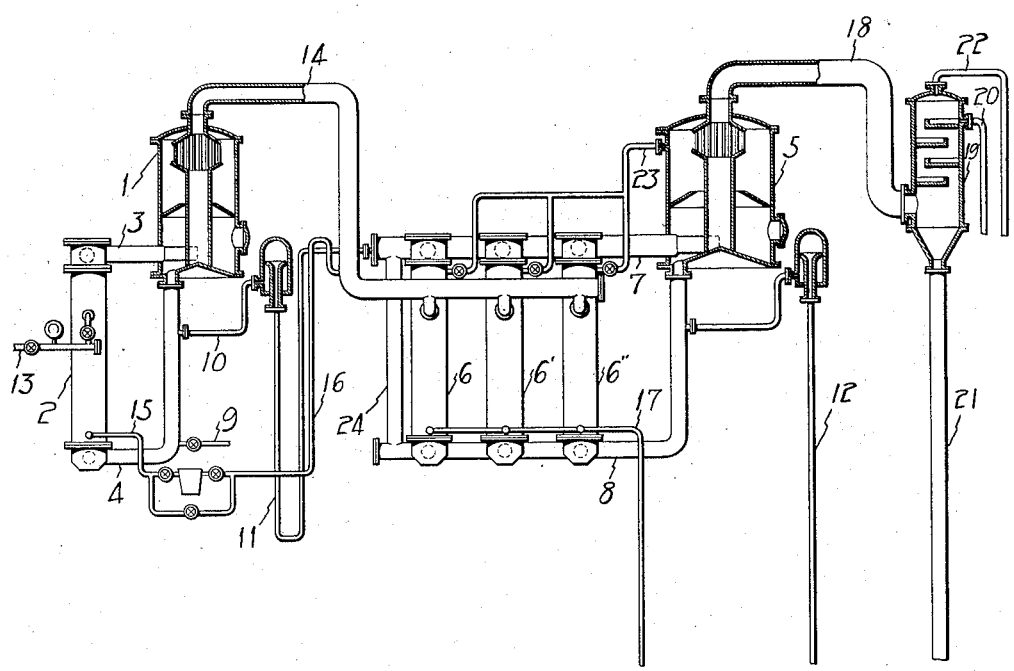
INVENTOR.
BY
Wenderoth, Lind & Ponack
Attys.

2,838,108

MULTIPLE EFFECT VACUUM EVAPORATOR

Shinzo Sumiya, Takaishicho, Senbokugun, Japan

Application May 9, 1955, Serial No. 507,040
In Japan August 3, 1949

Public Law 619, August 23, 1954
Patent expires August 3, 1969

2 Claims. (Cl. 159—17)

This invention relates to multiple effect vacuum evaporators and has for its object to lower the boiling point of the liquid in the first effect. By lowering the boiling point of the first effect it is possible to evaporate more readily and with less equipment damage, liquids which have an increased corrosive effect when they are heated, such as the coagulating bath used in the manufacture of viscose rayon, or the waste liquid yielded during the manufacture of sulfite pulp. Likewise it is possible to evaporate more readily substances which tend to decompose when heated, such as gelatin, glucose, fruit juice and the like.

According to the present invention there is provided a multiple effect vacuum evaporator having a plurality of stages each of which comprises heaters having a plurality of heating tubes for receiving a liquid to be evaporated, the outlet of the heaters leading to a separator for removing liquid entrained in the vapor passing through said outlet and the separator having an outlet connected for delivering the vapor to the heaters of the following stage to serve as the heating medium of said heaters; each of the heaters of the second and of the following stages having the same or greater heating area than each of the heaters of the first stage and comprising a plurality of said heaters, the first stage having less heaters than the second and following stage.

Since the heat flow in a certain effect of a multiple effect vacuum evaporator is proportional to the temperature difference ($\Delta t$) between the boiling liquid in the effect and heating steam or vapour generated in the preceding effect, the boiling point of the liquid in the preceding effect must always be higher by a certain amount than the boiling point of the liquid in the effect in question in order to keep the necessary evaporative capacity.

Generally the necessary quantity of heat flow (Q) to concentrate liquid by evaporation in each effect may be given by the following formulas:

$$Q_1 = U_1 A_1 \Delta t_1 \quad \text{(1st effect)}$$
$$Q_2 = U_2 A_2 \Delta t_2 \quad \text{(2nd effect)}$$
$$\cdot \cdot \cdot$$
$$\cdot \cdot \cdot$$
$$\cdot \cdot \cdot$$

where $U_1$, $U_2$ is the over-all heat transfer coefficient in each effect in B. t. u./hr. sq. ft. °F.

$A_1$, $A_2$ are the heating surfaces in the respective effects $\Delta t_1$, $\Delta t_2$ are the temperature differences between the boiling liquid and the heating steam or vapour in the respective effects Generally speaking, it can be taken that $Q_1 \approx Q_2 \approx \ldots$ and then $$U_1 A_1 \Delta t_1 \approx U_2 A_2 \Delta t_2 \approx \quad (1)$$

In the above formula, when we assume that $U_1 \approx U_2 \approx \ldots$ and take account of the fact that in ordinary multiple effect evaporators each effect is of same type, i. e. $A_1 = A_2 \ldots$, we have the following relation:

$$\Delta t_1 \approx \Delta t_2 \approx \quad (2)$$

For example, in a double effect vacuum evaporator each stage of which comprises heaters having a plurality of heating tubes for receiving a liquid to be evaporated, the outlet of the heaters leading to a separator for removing liquid entrained in the vapor passing through said outlet and the separator having an outlet connected for delivering the vapor to the heaters of the second stage to serve as the heating medium of said heaters, when two heaters of equal dimensions are used in the first effect and two other similar heaters in the second effect, and the temperature of the heating steam introduced in the first effect is 130° C. and the boiling point of the liquid in the second effect is 50° C., $\Delta t$ in each effect will be about 40° C. by the Formula 2 and the boiling point of the liquid in the first effect will be about 90° C. The boiling point of the liquid in the second effect will be naturally fixed by the nature of the liquid and the degree of vacuum, and consequently it is practically impossible to lower the boiling point of the liquid in the first effect particularly.

If the temperature of the heating steam introduced in the first effect is lowered, the boiling point of the liquid in the first effect can be lowered by reduction of the pressure but at the same time the evaporative capacity will be decreased.

By this invention it is possible to lower the boiling point of the liquid in the first effect without decreasing the evaporative capacity. This invention consists in making the ratios of the heating area and number of heaters of the second effect to those of the first effect larger than 1.

If the total heat flow Q in the stages remains the same, i. e. $Q_1 \approx Q_2 \approx \ldots$ and the over-all coefficient of heat transfer remains the same in each effect, i. e. $U_1 \approx U_2 \approx \ldots$, then if, according to the invention, the heating surface in the first effect is made less than the heating surface in the second effect, i. e. $A_1 < A_2 < \ldots$, then in the relationship expressed by Formula 1 $\Delta t_1$ is $> t_2$ is $> \ldots$ For instance if one heater is removed from the first effect and added to the second effect, the heating area in the second effect becomes three times as large as that in the first effect, and $\Delta t_1$ will become almost three times as large as $\Delta t_2$. If the heating steam temperature in the first effect and the boiling point of the liquid in the second effect are the same as in the above mentioned example, $\Delta t_1$ will be 60° C. and $\Delta t_2$ will be 20° C. Hence the boiling point of the liquid in the first effect will be 70° C. Thus, the boiling point of the liquid in the first effect, which was quite difficult to lower by the ordinary practice hitherto, can be appreciably lowered.

One form of this invention is illustrated in the accompanying drawing, in which the first heater 2 is placed on the upstream side with regard to the liquid flow of the first separating vessel 1, the upper part of the heater 2 is connected with the lower part of the first separating vessel 1 by means of the pipe 3, and the lower part of the heater 2 is connected with the bottom of the first separating vessel 1 by the pipe 4. The second heaters 6, $6^1$, $6^{11}$ each of the same dimensions as the first heater 2 are placed on the upstream side with regard to the liquid flow of the second separating vessel 5, their upper parts being connected with the lower part of the second separating vessel 5 by means of the pipe 7, and their lower parts with the bottom of the second separating vessel 5 by the pipe 8. The dilute solution, which flows into the pipe 4 from the pipe 9, is heated in the first heater 2, passes through the pipe 3, to the first separating vessel 1 where vapors are removed, and the concentrated solution left passes through the pipe 4, to be heated again in the first heater 2. Part of this liquid, concentrated to a definite degree during its circulation in this way, flows from the lower part of the first separating vessel 1 into the pipe 4, through the first concentrated liquid pipe 10 and the U-pipe 11. The liquid, which has flowed into the pipe 7 from the pipe 11, is heated in the second heaters 6, $6^1$, $6^{11}$ and passes through the pipe 7, to the second separating vessel 5, where vapors are removed, part of the residual liquid passing through the pipe 8, and being heated again in the second heaters 6, $6^1$, $6^{11}$ while the remainder of the liquid, concentrated to a definite degree during its circulation in this way, is continuously discharged through the second concentrated liquid pipe 12. 13 is the live steam inlet pipe; 14 is the pipe which introduces the vapor generated in the first separating vessel 1 from its upper part into the second heaters 6, $6^1$, $6^{11}$; 15 is the outlet pipe of the condensate from the first heater 2 and is connected with the pipe 14 by means of the pipe 16 in order to utilize the excess heat of the condensate for heating in the second heaters 6, $6^1$, $6^{11}$. 17 is the outlet pipe of the condensate from the second heaters 6, $6^1$, $6^{11}$; 18 is the pipe to extract the vapor generated in the second separating vessel 5 and the vapor is condensed in the condenser 19 by the cooling water from the pipe 20. The condensate and the cooling water wasted are discharged through the pipe 21, and the upper part of the condenser 19 is connected with the vacuum pump by means of the pipe 22. The pipe 23 connects the vapor chambers of the second heaters 6, $6^1$, $6^{11}$ with the upper part of the second separating vessel 5, by which the non-condensable gases in the first separating vessel 1 and in the vapor spaces of the second heaters 6, $6^1$, $6^{11}$ are extracted.

The ends of the pipe 7 and the pipe 8 are connected by the pipe 24, which helps the circulation of the boiling liquid at any distance from the second separating vessel 5. The heaters are arranged side by side along the pipes 7 and 8, and the number of heaters and of pipes 24 can be increased, if necessary. Thus it is possible to maintain the degree of vacuum and the temperature of the boiling liquid in any heater in constant and uniform condition and to arrange heaters at any distance far from the separating vessel. The quantity of liquid droplets entrained in the vapor from heaters 6, $6^1$, $6^{11}$ is substantially reduced during the passage of the vapors along the pipe 7 to the separator 5, and consequently the volume of the separating vessel may be made smaller or its construction may be much simplified.

Moreover the heaters may be arranged on the both sides of the pipes 7 and 8, and the required floor area can be saved as compared with the increase of the quantity of liquid to be treated.

Now suppose for comparison that two sets of double effect evaporators are installed, the one is the evaporator given in the accompanying drawing and the other is the ordinary double effect evaporator which has two heaters of same dimensions in each effect. When 3,650 litres of water are evaporated from 9,600 litres of coagulating acid bath in a rayon factory, the following results are obtained:

|  | Ordinary type | This invention's type |
|---|---|---|
| Live steam temperature in the 1st effect, °C | 110 | 110 |
| Boiling point of the liquid in the 1st effect, °C | 86 | 64 |
| Boiling point of the liquid in the 2d effect, °C | 50 | 50 |
| Live steam consumption, kg | 2,630 | 2,290 |

From the above, it is found that the boiling temperature of the liquid in the first effect can be lowered without any drop of evaporative capacity and the corrosive acid bath can be thickened safely by the double effect evaporator with an advantage of decreasing the steam consumption remarkably.

I claim:

1. A multiple effect vacuum evaporator having a plurality of stages, each of which comprises at least one heater and a single separator for removing liquid entrained in the vapor passing through said separator, each of said heaters having a plurality of heating tubes for receiving a liquid to be evaporated, the outlet of each of the heaters in each stage leading to the separator, the separator for each stage having an outlet connected for delivering the vapor to the heaters in the following stage to serve as the heating medium for said heaters, said heaters in each stage being vertical, and an upper and a lower horizontal circulation pipe in each stage connected between the heater and the separator in that stage, the number of heaters in the second stage being greater than the number of heaters in the first stage for producing a temperature difference in the first stage greater than the temperature difference in the second stage, the number of heaters in the stage following the second being at least the same as the number of heaters in the second stage, and each of the heaters in a given stage following the first stage having at least the same heating area as each of the heaters in the stage preceding that stage.

2. A multiple effect vacuum evaporator as claimed in claim 1 and at least one vertical pipe connecting said horizontal upper and lower circulation pipes.

References Cited in the file of this patent

UNITED STATES PATENTS

| 626,971 | Craney | June 13, 1899 |
| 1,068,789 | McGregor | July 29, 1913 |
| 1,143,744 | Bauer | June 22, 1915 |
| 1,582,066 | Moore | Apr. 27, 1926 |
| 2,189,083 | Renkin | Feb. 6, 1940 |
| 2,703,610 | Cross | Mar. 8, 1955 |

FOREIGN PATENTS

| 252,505 | Great Britain | June 3, 1926 |
| 713,844 | Great Britain | Aug. 18, 1954 |